United States Patent
Roberts et al.

(10) Patent No.: US 7,295,228 B2
(45) Date of Patent: Nov. 13, 2007

(54) SECURITY CAMERA SYSTEMS

(75) Inventors: Patricia Roberts, Romsey (GB); Carl Stennett, Salisbury (GB); Chris Harris, Romsey (GB); Ken King, Romsey (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/149,973

(22) PCT Filed: Dec. 18, 2000

(86) PCT No.: PCT/GB00/04847

§ 371 (c)(1),
(2), (4) Date: Oct. 29, 2002

(87) PCT Pub. No.: WO01/45415

PCT Pub. Date: Jun. 21, 2001

(65) Prior Publication Data
US 2003/0095183 A1    May 22, 2003

(30) Foreign Application Priority Data
Dec. 18, 1999   (GB)   ................................. 9929870.5

(51) Int. Cl.
  *H04N 5/225*   (2006.01)
  *H04N 5/228*   (2006.01)
  *H04N 7/18*    (2006.01)

(52) U.S. Cl. .................. 348/143; 348/208.14; 348/169
(58) Field of Classification Search ................ 348/143, 348/152, 153, 158, 161, 169, 159, 208.14; 702/188; 345/716, 720
See application file for complete search history.

(56) References Cited

U.S. PATENT DOCUMENTS

| 5,164,827 | A  | * | 11/1992 | Paff ............................ 348/143 |
| 5,625,410 | A  | * | 4/1997  | Washino et al. ............. 348/154 |
| 5,774,569 | A  | * | 6/1998  | Waldenmaier .............. 382/100 |
| 6,002,995 | A  | * | 12/1999 | Suzuki et al. ............... 702/188 |
| 6,144,375 | A  | * | 11/2000 | Jain et al. ................ 715/500.1 |
| 6,359,647 | B1 | * | 3/2002  | Sengupta et al. ........... 348/154 |
| 6,437,819 | B1 | * | 8/2002  | Loveland .................... 348/143 |
| 6,535,226 | B1 | * | 3/2003  | Sorokin et al. ............. 345/723 |

* cited by examiner

*Primary Examiner*—Gims Philippe
*Assistant Examiner*—Erick Rekstad
(74) *Attorney, Agent, or Firm*—Crowell & Moring LLP

(57) ABSTRACT

A security camera system is provided. Several video cameras operate in conjunction with an image display monitor, a user control and camera selector means whereby a target of interest may be followed. Each two cameras providing adjacent areas of coverage are operable to provide an overlay image portion at transition regions of a displayed image. Upon movement of the target of interest to a specified transition region of a currently displayed image provided by one video camera, the camera selection means is operable to select a second camera whereby to maintain target display continuity by the monitor.

16 Claims, 2 Drawing Sheets

SECURITY CAMERA SYSTEMS

Figure 1:
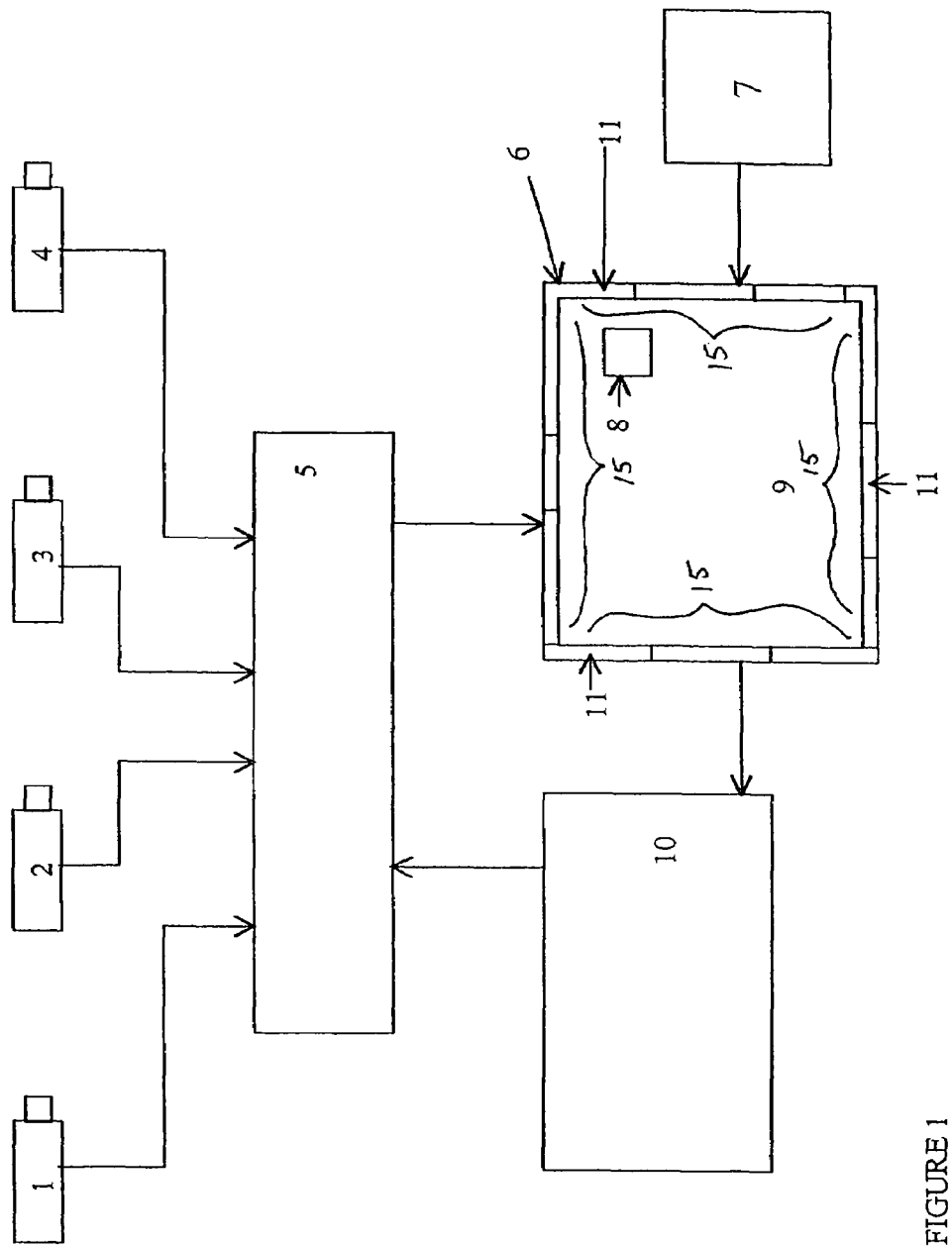

This invention relates to security camera systems and more especially but not exclusively it relates to camera systems of the kind used in shopping precincts or urban centres to provide video surveillance.

Camera systems providing video surveillance are in common use and may comprise a large number of cameras in order to provide adequate video surveillance of a prescribed area. If an incident occurs, security staff in 'closed circuit television' (CCTV) control rooms, will attempt to keep a person involved in the incident, and who might be making haste to leave the scene, within the field of view. This might involve switching between cameras, as the person leaves the field of view of one camera and enters the field of view of another camera or cameras, so that the camera used is always the one which affords the best view of the person being observed. In practice, this can be difficult, requiring highly trained staff who are familiar with the camera layout on a particular site. It is therefore all too easy to lose track of a person, even on a site having good camera coverage, and this may result in the loss of vital evidence, since video surveillance data used for prosecution is typically required to be continuous in time.

It is an object of this invention to provide an improved camera system wherein the tracking of a person moving between areas covered by different security cameras is facilitated whereby the task of security staff is simplified.

In accordance with a further aspect of the invention, there is provided a security camera system comprising a plurality of video cameras, an image display monitor, a user control and camera selector means; wherein the cameras' images in combination can provide a predetermined overall area of coverage; wherein a target of interest can be observed by a first video camera and an image of said target be displayed on the monitor; characterised in that overlap image portions at transition regions of a displayed image are provided by two adjacent cameras, each such transition region being displayed as a 'button' region by the image display; wherein there are a plurality of such 'button' regions being arranged about or surround a central area in an image in a field of view; wherein, upon movement of the target to a transition region, the user control is operable to select the 'button' region of an image displayed, whereby to select a second camera and to employ video signals from the second video camera to maintain target image continuity.

The user control may comprise a mouse or a like device to control a cursor which is operable to indicate when the target has moved to an image transition region. Alternatively or additionally a touch sensitive screen may be provided.

The user control may be used to select a transition region displayed by the image display monitor, from a plurality of such regions which are arranged to surround an image displayed, and which are also arranged within the image, the transition region selected indicating an image region of a currently displayed image approached by a target, in dependence upon which transition region selection, video signals from another of the video cameras are used thereby to maintain target display continuity by the monitor.

Conveniently the user control includes a CPU, which is operable to store data including, in respect of each camera, the pixel positions of the lines at which transitions occur, and the identity of the camera to be selected at that transition. The data stored in the CPU may include, for example, in respect of each camera: image centre data, focal length data, and distortion parameters. At least some of the cameras may be fixed and/or at least some of the cameras may be pan-tilt-zoom (PTZ) cameras. The CPU may include image processing software which operates to recognise the character of an image by comparing it for correspondence with a plurality of stored reference images, in dependence upon which comparison, the CPU operates for camera selection.

The CPU may include image processing software which operates to recognise a character in an image by comparing key features of the image for correlation with key features in a plurality of stored reference images in dependence upon which comparison the CPU operates for camera selection.

In one embodiment the features along one or more co-ordinates of an image may be compared for correlation with the features of one or more corresponding co-ordinates of a reference image.

The video camera may be a thermo-sensing camera such as an infra-red camera.

In accordance with a further aspect of the invention, there is provided a security camera system, a method of operating a security camera system comprising a plurality of video cameras, an image display monitor, a user control and camera selector means; wherein the cameras' images in combination can provide a predetermined overall area of coverage; wherein a target of interest can be observed by a first video camera and an image of said target be displayed on the monitor; wherein overlap image portions at transition regions of a displayed image are provided by two adjacent cameras, each such transition region being displayed as a 'button' region by the image display; wherein there are a plurality of such 'button' regions being arranged about or surround a central area in an image field of view; wherein, upon movement of the target to a transition region, the user control is operable to select the 'button' region of an image displayed, whereby to select a second camera and to employ video signals from the second video camera; the method comprising the steps of: observing a target of interest displayed as an image on the monitor; characterised in that upon movement of the target to a transition region, operating the camera selection means whereby an image from a second camera is displayed, whereby target image continuity may be maintained. The user control may comprise a mouse or a like operative device operable to control a cursor which can be used to track the target and to indicate when it has moved to an image transition region.

Figure 2:
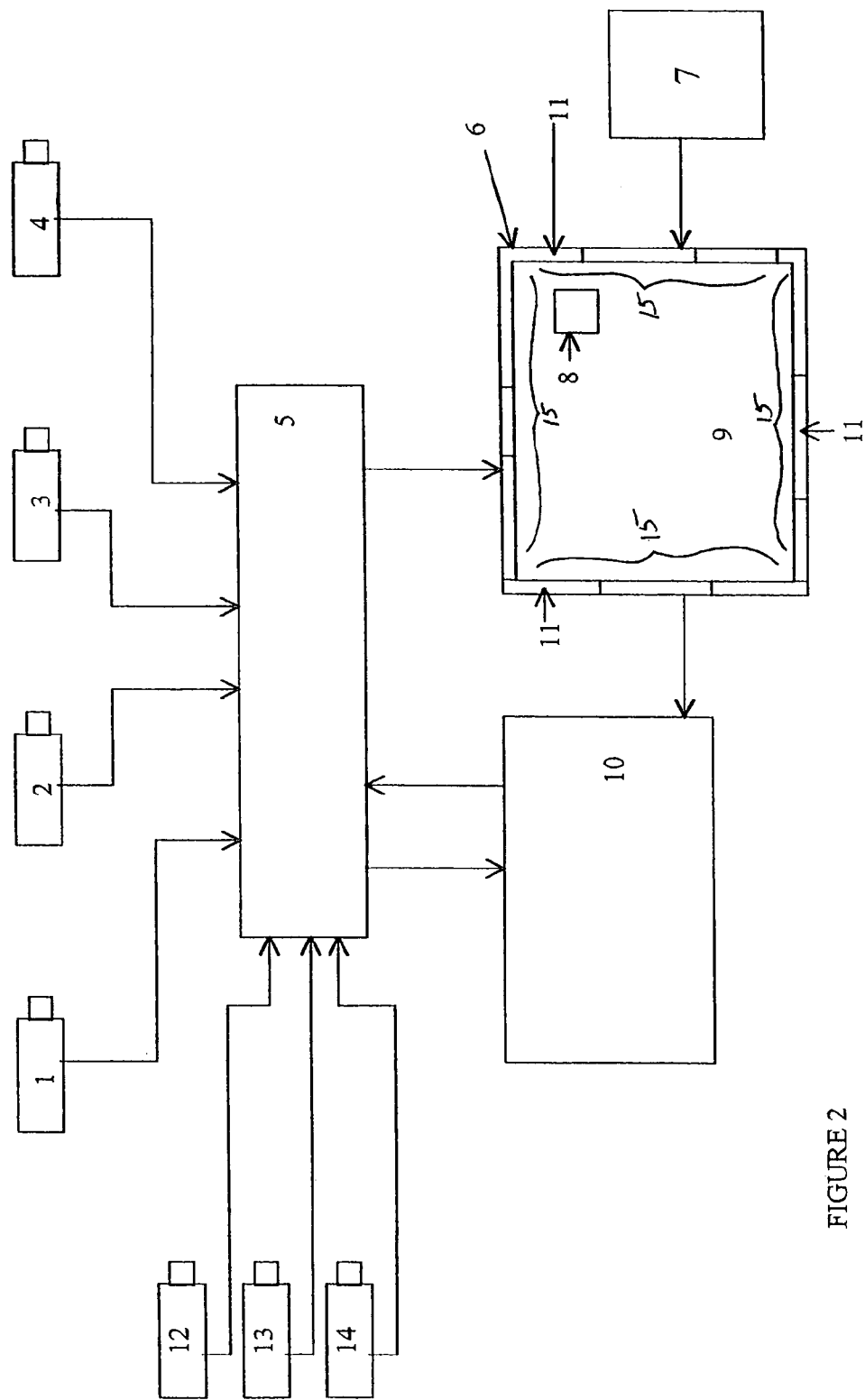

One embodiment of the invention will now be described by way of example only with reference to accompanying drawings wherein;

FIG. 1, is a schematic block diagram of a security camera system using fixed cameras and, FIG. 2, is a schematic block diagram of a security camera system using fixed cameras and PTZ cameras wherein parts corresponding to those shown in FIG. 1 bear the same numerical designations.

Referring now to FIG. 1, an exemplary security camera system is shown, of the kind used in shopping precincts or urban centres to provide video surveillance comprises a plurality of fixed security cameras 1, 2, 3, 4, which are arranged to feed their respective video signals to a camera matrix 5. The camera matrix 5, serves as a video camera selector, to select the signals from one of the cameras 1, 2, 3, 4, for display on the screen of an image display monitor 6, which is operatively associated with a user interaction device 7. The device 7, might conveniently comprise a mouse or the like which can be used to move a cursor 8, around an image display 9, on the display monitor 6. Instead of there being a memory means associated with the matrix (control selection means), there is provided a separate CPU which receives signals from the camera matrix relating to all the signals from the cameras. The camera matrix 5, is controlled by the CPU in which data is retained relating to a fixed field of view afforded by each of the cameras 1, 2, 3, 4, and the position of the cursor 8. In operation, a target person, for example, may be visually followed by an operator across a current image field of view and when the target approaches an edge of the field of view, the device 7 may be used to 'mark' the spot with the cursor 8, for example by 'clicking' on the boundary. Data identifying the marked spot together with data appertaining to each available camera image is then processed in the CPU in order to select the most suitable camera to feed the monitor 6.

In an alternative embodiment the image displayed may be surrounded by 'button regions' 11, the 'button region' (or regions) adjacent to a spot whereat a target approaches the limit of an image being selected using the cursor 8, and the device 7, in order to provide information for the CPU to facilitate selection of an appropriate one of the cameras 1, 2, 3, or 4 for the image display 9.

In a still further embodiment, the screen may be equipped with a touch sensitive screen, whereby the camera is selected following the placing of a finger, for example, upon a touch sensitive portion of the screen.

Referring now to FIG. 2, in an alternative arrangement PTZ cameras 12, 13, and 14, are used in addition to the fixed cameras 1, 2, 3, 4. In this arrangement data is stored in the CPU appertaining to various parameters relating to the image produced by each of the PTZ cameras 12, 13, 14, to facilitate image processing in the CPU in order to determine the relationship of each image, to other images, to the overall display coverage and to the cursor and/or button positions, whereby a determination in the CPU of the most appropriate camera to use is facilitated.

Considering now some applications, it will be appreciated that a system according to this invention would enable security staff to track a suspect target through the images provided by a set of video cameras, using both PTZ cameras and/or fixed cameras or, indeed, to have a system having logic operable to track an identified target. It is apparent that with fixed cameras, the problem is comparatively easily solved by knowledge of the transition regions in each camera where the subject leaves the field of view, and of the camera on which that region can next be seen.

Alternatively, if a point in one image is selected, all other cameras on which that point can be seen, could be displayed, for example, as windows on a PC display. The security staff would then be capable of tracking a target individual by 'clicking' on the current image view at a point where the target individual goes off the edge of the scene, so as to prompt the provision a fresh display provided by the best one of the other cameras to which the target is visible.

For PTZ cameras the problem is somewhat more complex, but is nevertheless soluble. In existing camera installations, it is unlikely that the PTZ cameras will have feedback of the values of pan, tilt and zoom available to the PC. This information, or some equivalent information, is necessary to determine on which new cameras a target will be visible when leaving the field of view of a current camera. This information can however be measured, as herein before explained, by using image processing. This method requires comparison of a current image with a set of stored reference images to determine where the transition regions occur in the current image. This could be done in real-time whilst a camera was being moved by operation of it joystick control, to determine its current PTZ parameters. With the use of a smart CPU, the functions of a user control could be reduced to that of selecting a target.

The invention claimed is:

1. A security camera system comprising:
   a plurality of video cameras;
   an image display monitor;
   a user control; and
   camera selector means; wherein
   the cameras' images in combination can provide a predetermined overall area of coverage;
   a target of interest can be observed by a first camera and an image of said target be displayed on the monitor;
   an image acquired by said first camera overlaps with an adjacent image acquired by at least one other camera, forming a transition region, said transition region being defined by a portion that is common to the images of both said first camera and said at least one other camera;
   each such transition region is displayed as a 'button' region by the image display;
   there are a plurality of such 'button' regions which substantially surround a central portion of an image in a field of view; and
   upon movement of the target to a transition region, the user control is operable to select the 'button' region in which the target appears in a displayed image, so as to select a second camera and to employ video signals from the second video camera to maintain target image continuity.

2. A security camera system as claimed in claim 1, wherein the user control comprises a device operable to control a cursor which can be used to track the target and to indicate when it has moved to an image transition region.

3. A security camera system as claimed in claim 1 wherein the user control comprises a touch sensitive screen.

4. A security camera system as claimed in claim 1, wherein the user control includes a CPU and wherein the CPU is operable to store data including, for example, in respect of each camera: image center data, focal length data distortion parameters, and x,y,z, and pan and tilt data.

5. A security camera system as claimed in claim 1, wherein at least some of the cameras are fixed.

6. A security camera system as claimed in claim 1, wherein at least some of the cameras are PTZ cameras.

7. A security camera system as claimed in claim 6, wherein the CPU includes image processing software for PTZ cameras, which software operates to recognize the character of an image by comparing it for correspondence with a plurality of stored reference images, in dependence upon which comparison the CPU operates for camera selection.

8. A security camera system as claimed in claim 7, wherein the CPU includes image processing software which operates to recognize the character of an image by comparing key features of the image for correspondence with key features in a plurality of stored reference images in dependence upon which comparison the CPU operates for camera selection.

9. A security camera system as claimed in claim 8, wherein key features along one or more co-ordinates of an image are compared for correspondence with the key features along one or more corresponding co-ordinates of a reference image.

10. A security camera system as claimed in claim 6, wherein the data stored in the CPU includes in respect of each camera, the pixel positions of lines at which transitions occur, and the identity of a camera to be selected at that transition.

11. A security camera system as claimed in claim 1, wherein the video camera is an infra-red camera.

12. A method of operating a security camera system comprising a plurality of video cameras, an image display monitor, a user control and a camera selector means; wherein, the cameras' images in combination can provide a predetermined overall area of coverage;

a target of interest can be observed by a first camera and an image of said target can be displayed on the monitor;

an image acquired by said first camera overlaps with an adjacent image acquired by at least one other camera, forming a transition region, said transition region being defined by a portion that is common to the images of both said first camera and said at least one other camera;

each such transition region is displayed as a 'button' region by the image display;

there are a plurality of such 'button' regions which substantially surround a central portion of an image field of view; and upon movement of the target to a transition region, the user control is operable to select the 'button' region in which the target appears in a displayed image, whereby to select a second camera and to employ video signals from the second video camera;

the method comprising the steps of:

observing a target of interest displayed as an image on the monitor; and upon movement of the target to a transition region, operating the user control to select the button in which the target appears, whereby said camera selector means causes an image from a second camera to be displayed so that target image continuity may be maintained.

13. The method according to claim 12, wherein the user control comprises a mouse or the like operative to control a cursor which is operable to track the target and to indicate when it has moved to an image transition region.

14. The method as claimed in claim 12 wherein the user control comprises a touch sensitive screen.

15. The method according to claim 14, wherein:

the user control is operable to select a 'button' region displayed by the image display monitor, from a plurality of such regions which are arranged about or surround an image displayed, the 'button' region selected indicating a particular transition region of a currently displayed image approached by the target; and dependent upon a particular 'button' region selection, video signals from another of the video cameras are used thereby to maintain target display continuity by the monitor.

16. The method as claimed in claim 14, wherein the user control is operable to select a transition region displayed by the image display monitor, from a plurality of such regions which are arranged about or surround an image displayed, the transition region selected indicating an image region of a currently displayed image approached by a target, in dependence upon which transition region selection, video signals from another of the video cameras are used, thereby to maintain target display continuity by the monitor.

* * * * *